US010417149B2

(12) United States Patent
Singh et al.

(10) Patent No.: US 10,417,149 B2
(45) Date of Patent: Sep. 17, 2019

(54) SELF-ALIGNING A PROCESSOR DUTY CYCLE WITH INTERRUPTS

(71) Applicant: Intel Corporation, Santa Clara, CA (US)

(72) Inventors: Ruchika Singh, Portland, OR (US); Paul S. Diefenbaugh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 388 days.

(21) Appl. No.: 14/298,225

(22) Filed: Jun. 6, 2014

(65) Prior Publication Data

US 2015/0356035 A1   Dec. 10, 2015

(51) Int. Cl.
G06F 1/32    (2019.01)
G06F 13/24   (2006.01)
G06F 1/3203  (2019.01)

(52) U.S. Cl.
CPC .......... G06F 13/24 (2013.01); G06F 1/3203 (2013.01)

(58) Field of Classification Search
CPC ..... G06F 1/32; G06F 1/00; G06F 1/28; G06F 1/26
USPC ....... 713/300, 310, 320, 321, 322, 323, 324, 713/330, 345, 375
See application file for complete search history.

(56) References Cited

U.S. PATENT DOCUMENTS

| | | |
|---|---|---|
| 5,163,153 A | 11/1992 | Cole et al. |
| 5,522,087 A | 5/1996 | Hsiang |
| 5,590,341 A | 12/1996 | Matter |
| 5,621,250 A | 4/1997 | Kim |
| 5,761,524 A * | 6/1998 | Peterson ............. G06F 9/30065 712/17 |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |

(Continued)

FOREIGN PATENT DOCUMENTS

| | | |
|---|---|---|
| EP | 1 282 030 A1 | 5/2003 |
| TW | 201218072 | 5/2012 |

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Jaweed A Abbaszadeh
*Assistant Examiner* — Keshab R Pandey
(74) *Attorney, Agent, or Firm* — Trop, Pruner & Hu, P.C.

(57) ABSTRACT

In an embodiment, a processor includes a plurality of cores to independently execute instructions, at least one graphics engine to independently execute graphics instructions, and a power controller including a duty cycle logic to set a duty cycle having a cycle time formed of an active time window in which at least some of the plurality of cores are to be active and an idle time window in which the plurality of cores are to be in a low power state. The duty cycle logic may adjust a duration of at least one of an active time window and an inactive time window based on interrupt information to accommodate an impending interrupt within the active time window. Other embodiments are described and claimed.

21 Claims, 11 Drawing Sheets

(56) References Cited

U.S. PATENT DOCUMENTS

| | | | |
|---|---|---|---|
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,174,469 B2 | 2/2007 | Luick | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,526,661 B2 | 4/2009 | Nakajima et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 8,112,648 B2* | 2/2012 | Branover | G06F 1/3203 713/320 |
| 8,131,941 B2* | 3/2012 | Kinter | G06F 12/0811 711/141 |
| 8,412,974 B2* | 4/2013 | Chen | G06F 1/08 713/375 |
| 8,694,994 B1* | 4/2014 | Vincent | G06F 9/5094 718/1 |
| 9,092,048 B1* | 7/2015 | Owen | G06F 1/00 |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2003/0105983 A1* | 6/2003 | Brakmo | G06F 1/3203 713/320 |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2005/0258883 A1* | 11/2005 | Farjad-rad | G06F 1/04 327/295 |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0067453 A1* | 3/2006 | Duelk | H03L 7/0812 375/376 |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2006/0288240 A1* | 12/2006 | Kardach | G06F 1/3228 713/300 |
| 2007/0005995 A1 | 1/2007 | Kardach et al. | |
| 2007/0016817 A1 | 1/2007 | Albonesi et al. | |
| 2007/0074214 A1* | 3/2007 | Ueno | G06F 9/542 718/100 |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0230619 A1* | 10/2007 | Poberezhskiy | H03C 3/40 375/308 |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0141062 A1* | 6/2008 | Yamaoka | G06F 1/10 713/501 |
| 2008/0250260 A1 | 10/2008 | Tomita | |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0115309 A1 | 5/2010 | Carvalho et al. | |
| 2010/0146513 A1 | 6/2010 | Song | |
| 2010/0156888 A1* | 6/2010 | Luk | G06T 1/20 345/418 |
| 2010/0191997 A1 | 7/2010 | Dodeja et al. | |
| 2011/0154090 A1 | 6/2011 | Dixon et al. | |
| 2012/0079290 A1 | 3/2012 | Kumar | |
| 2012/0246506 A1 | 9/2012 | Knight | |
| 2013/0007494 A1* | 1/2013 | Branover | G06F 1/3203 713/323 |
| 2013/0061064 A1 | 3/2013 | Ananthakrishnan et al. | |
| 2013/0080803 A1 | 3/2013 | Ananthakrishnan et al. | |
| 2013/0080804 A1 | 3/2013 | Ananthakrishnan et al. | |
| 2013/0111120 A1 | 5/2013 | Ananthakrishnan et al. | |
| 2013/0111121 A1 | 5/2013 | Ananthakrishnan et al. | |
| 2013/0111226 A1 | 5/2013 | Ananthakrishnan et al. | |
| 2013/0111236 A1 | 5/2013 | Ananthakrishnan et al. | |
| 2014/0068290 A1 | 3/2014 | Bhandaru et al. | |
| 2014/0276710 A1* | 9/2014 | Wittenberger | A61B 18/02 606/24 |
| 2015/0153393 A1* | 6/2015 | Jeon | G06F 1/206 702/60 |

OTHER PUBLICATIONS

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling In Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of a Processor," by Intel Corporation.

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

U.S. Appl. No. 14/109,388, filed Dec. 17, 2013, entitled "Rescheduling Workloads to Enforce and Maintain a Duty Cycle," by Inder M. Sodhi, et al.

Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.

(56) References Cited

OTHER PUBLICATIONS

Taiwan Intellectual Property Office, Office Action dated Apr. 26, 2016 in Taiwanese Patent Application No. 104113710. (Translation Redacted).

* cited by examiner

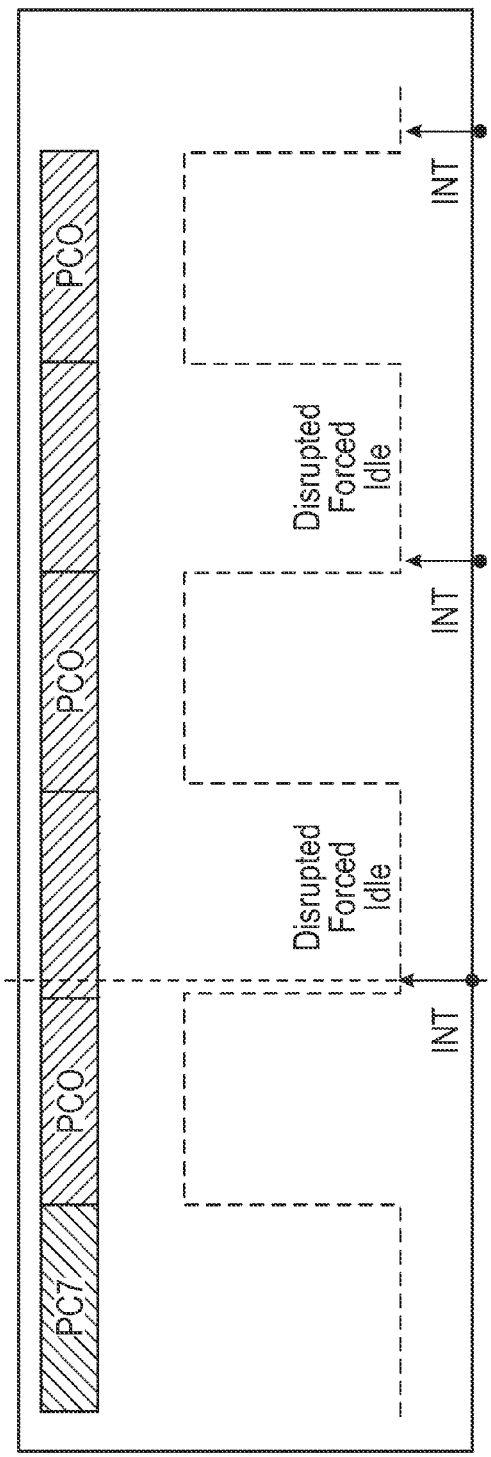
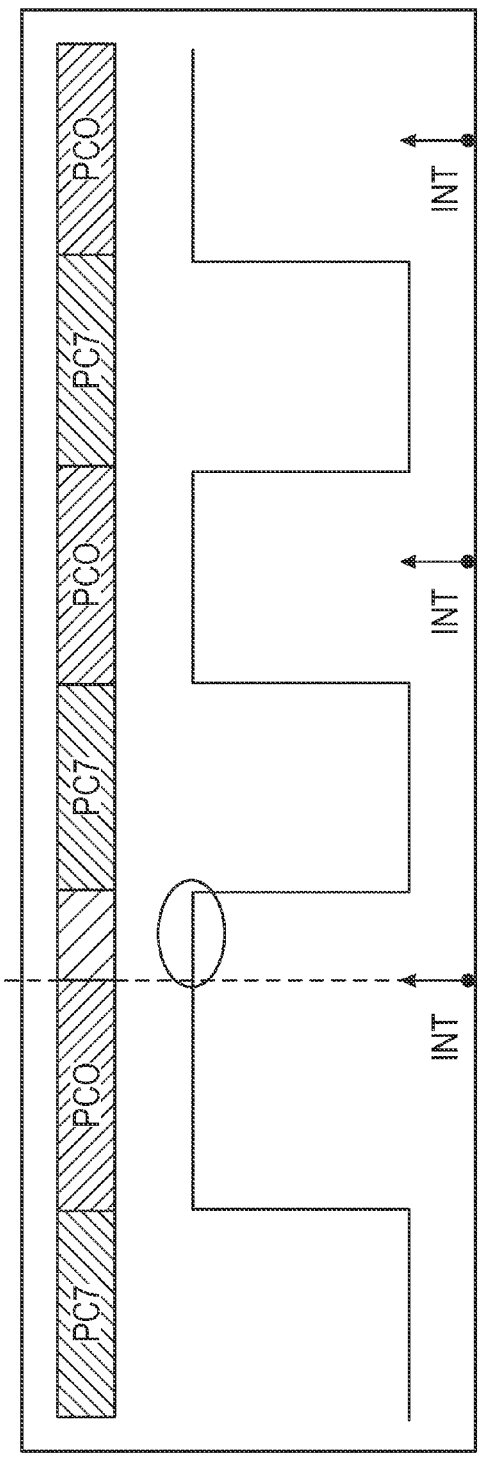
FIG. 3A
FIG. 3B

SELF-ALIGNING A PROCESSOR DUTY CYCLE WITH INTERRUPTS

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

BRIEF DESCRIPTION OF THE DRAWINGS

FIG. 3A is a timing diagram of activity levels for a processor without interrupt self-aligning according to an embodiment of the present invention.

FIG. 3B is a timing diagram of activity levels for a processor with interrupt self-aligning according to an embodiment of the present invention.

DETAILED DESCRIPTION

Figure 1:
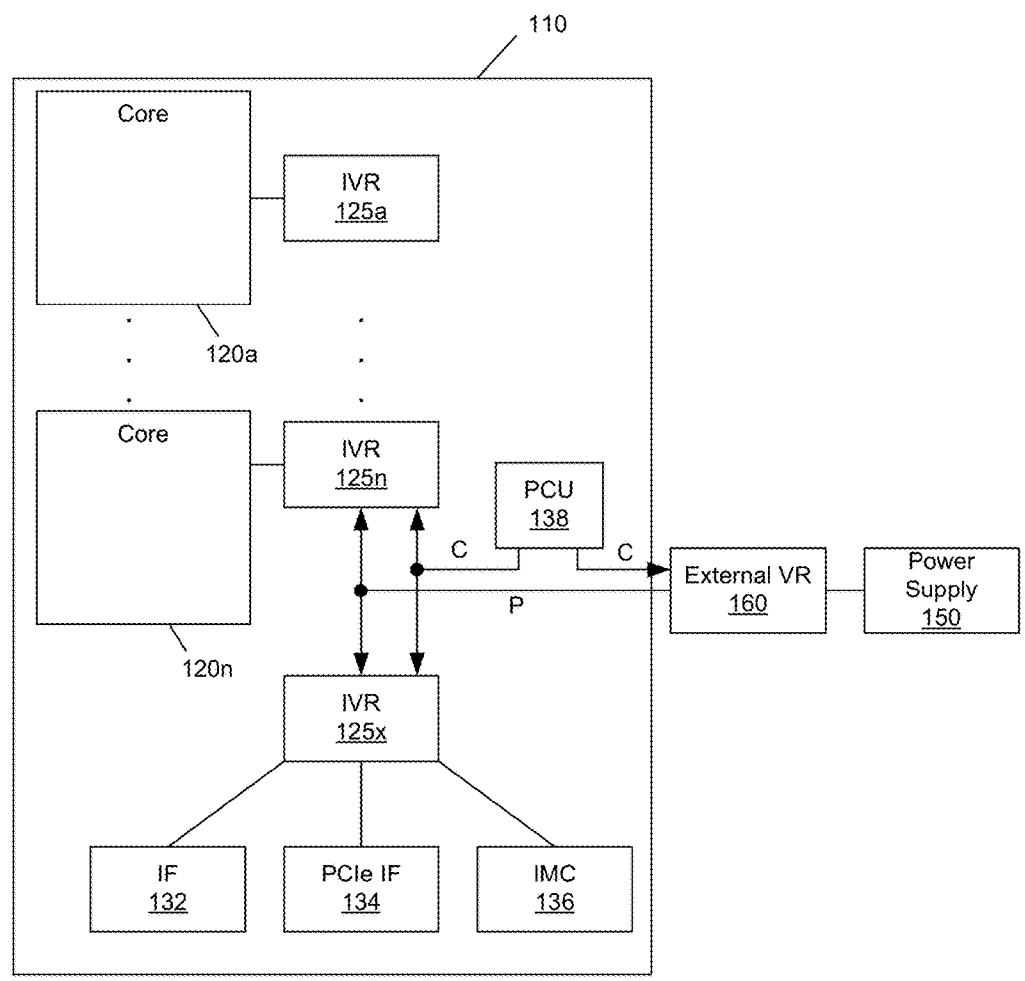
FIG. 1 is a block diagram of a system in accordance with one embodiment of the present invention.

In various embodiments, a technique is provided in hardware of a system on chip (SoC) or other processor to align the activity of multiple computing engines to realize power consumption savings. More specifically, embodiments provide control techniques to enable the different computing engines (also referred to herein as "intellectual property (IP) blocks", "IP logics", or "IP logic blocks") to enter into and exit low power states in a synchronized and aligned manner.

In addition, active states may be self-aligned by the hardware based on one or more impending interrupts. As used herein the term "impending interrupt" means some disruption directed to a processor or component thereof that is to occur at a future time, and determination of which may be based on information provided to the processor. "Interrupts" include traditional interrupts such as device interrupts, system management interrupts and so forth as well as other events that trigger particular handlers or routines to occur, such as timer timeouts, expirations, or other such events.

The alignment between active states and hardware and/or software interrupts enables improved performance of interrupt handling, and avoids delayed or deferred interrupts processing, which can impact quality of service (QoS) and/or user-perceived performance. Using decision heuristics as described herein, embodiments may achieve power savings without a performance tradeoff.

In an embodiment, a power control circuit of a processor such as a power control unit (PCU) may receive policy inputs from, e.g., one or more software drivers that set the policy on what level of duty cycle the processor (or distinct portions) should operate at for a given workload level. In addition, the power control unit includes logic to analyze concurrency information regarding workloads being executed by the different IP logic blocks and to determine based at least in part on the information, collective or global "active" and "idle" windows, respectively. Furthermore, a power control unit can include additional logic to analyze interrupt activity and control the timing of active and idle states based on impending interrupts. Such logic may extend or shorten an active (and/or idle) state duration to better accommodate interrupts such that incoming interrupts are received and handled while one or more cores are in an active state to reduce latency of interrupt handling. Still further, in some embodiments such logic may further operate to dynamically adjust duty cycle parameters based on these extensions or narrowing of active (or idle) duty cycles. Stated another way, when an active state duration is lengthened to accommodate one or more interrupts, the length of such extension can be considered in determining whether to lengthen one or more corresponding idle states. Furthermore, it is possible to adjust the duty cycle parameters (e.g., active state duration and idle state duration) based on the interrupt analysis.

In general, the PCU may control the collective windows to enable the processor to enter into longer and deeper low power states, as various logic blocks (at least some, and possibly all logic blocks of the device) may be controlled to only be in an active state during an active window. Stated another way, embodiments may dynamically reschedule workloads scheduled to a given IP logic so that a collection of logics may be placed into a low power state during an idle window. Embodiments further provide hardware, e.g., within the individual logic blocks to receive a "sleep" signal from the power control unit and transition the IP block from active to idle and also to receive a "wakeup" signal from the PCU and transition the IP block to allow it to resume activity.

Thus embodiments provide hardware techniques to align the IPs in a SoC for aligning work and reducing package active time. By detecting and aligning various IP blocks of an SoC or other processor to duty cycle their on/off time concurrently and with reference to impending interrupts, power consumption and performance may be enhanced.

Referring now to FIG. 1, shown is a block diagram of a portion of a system in accordance with an embodiment of the present invention. As shown in FIG. 1, system 100 may include various components, including a processor 110 which as shown is a multicore processor such as a given SoC. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. Although the compute engines shown in FIG. 1 are cores, understand that a SoC or other processor may include non-core compute engines such as graphics engines or fixed function units, among others. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. As seen, each of these components may be powered by another integrated voltage regulator 125x. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include logic to align or otherwise reschedule workloads to enforce a duty cycle technique, at least in semi-active condition of the processor, such that all compute engine activity is idled, and the compute engines are concurrently enforced to be in a low power state for an idle window portion of a cycle interval. PCU 138 may further include logic to adjust one or more active and/or idle states based on impending interrupts, and further to possibly control parameters of the duty cycle arrangement based on such interrupts to enable the interrupts to be timely handled while the processor is in an active state.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the dynamic workload alignment, rescheduling and interrupt-based self-aligning within active states described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Figure 2A:
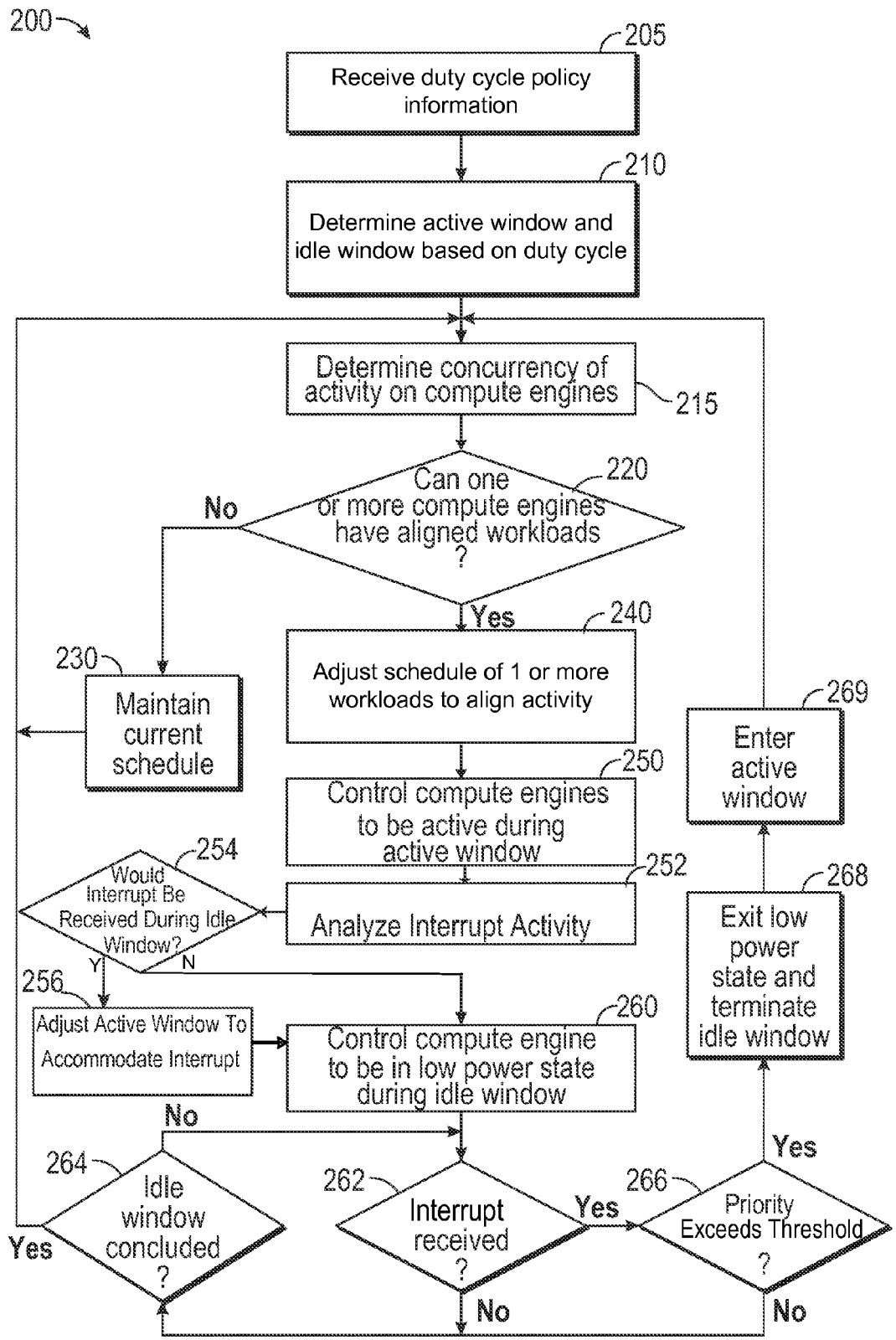
FIG. 2A is a flow diagram of a method in accordance with an embodiment of the present invention.

Referring now to FIG. 2A, shown is a flow diagram of a method in accordance with an embodiment of the present invention. As shown in FIG. 2A, method 200 may be performed by logic of a power control unit of an SoC or other processor type. For example in an embodiment, alignment logic of a PCU (and which in some embodiments may be part of a PCU duty cycle logic) of an SoC may perform method 200. This alignment logic may be implemented as a finite state machine (FSM), in an embodiment.

As seen, method 200 begins by receiving duty cycle policy information (block 205). Although the scope of the present invention is not limited in this regard, in an embodiment this policy information may be received from a driver such as a driver present in a system basic input output system (BIOS) or other system software. This driver provides hints to logic of the PCU to enable the logic to cause IP blocks to align their active times according to a given duty cycle. Responsive to setting of this desired duty cycle, the logic may reschedule one or more workloads to cause the IP blocks to be forced into idle/active modes concurrently.

In some embodiments, this duty cycle policy information may be based on user preferences for a tradeoff between power consumption and performance desired for a given form factor. Understand that these preferences also may change based on a state of the platform. For example, when a system is powered by AC power (e.g., a wall plug) a user preference may weigh further in favor of performance rather than power savings. In contrast, when operating a portable device on battery power, the user preference may weigh in favor of reduction in power consumption. This is especially so in situations where environmental information is further taken into account. That is, when in a battery operated mode in which a system detects presence of a low battery condition, the hints provided by way of this policy information may be in favor of power savings, rather than performance.

Still referring to FIG. 2A, next control passes to block 210 where durations of active windows and idle windows may be determined based on this duty cycle information. In an embodiment, this determination may be based on the policy information received and further based on environmental conditions, present and predicted workloads, Quality of Service (QoS) requirements from interactive workloads, among other considerations. In an embodiment, this determination may provide lengths of an active window and an idle window in accordance with the duty cycle. For example, assume a duty cycle of 30%. In this example, the active window may be set for a duration of time corresponding to 30% of the total cycle time while the idle window may be set for a time duration corresponding to the 70% of the total cycle time. Assume a cycle time period of 1.0 ms. In this case, the active window may be 0.3 ms and the idle window may be 0.7 ms.

Still referring to FIG. 2A, the logic may further determine a concurrency of activity on compute engines of the processor (block 215). In an embodiment, this logic may monitor workloads being executed on the various cores to obtain a measure of concurrency. For example, a set of registers may be provided, one for each compute engine, with different indicators for a monitoring window. When a given indicator is set, this may indicate that the engine is active in the corresponding time window and when reset, may indicate inactivity. Note that in an embodiment the monitoring window may correspond to multiple cycles of the duty cycle, e.g., between compute cores and a graphics engine or between a graphics render engine and a display device.

Understand that various considerations may be taken into account in determining whether an alignment may occur. Although the scope of the present invention is not limited in this regard, as examples these considerations include analysis of producer/consumer models, overlap or independence of workloads, memory boundedness, latency of throughput or other constraints. If the determination in diamond 220 is in the negative, control passes to block 230 where a current schedule of workloads may be maintained.

Instead if the determination is in the affirmative, control passes from diamond 220 to block 240 where a schedule of one or more workloads may be adjusted. More specifically, the logic may reschedule one or more workloads scheduled by a scheduler (e.g., an OS scheduler or a hypervisor scheduler such as a virtual machine monitor) to enable alignment of activity for the compute engines. Note that this adjustment or rescheduling of one or more workloads is performed in a manner that is transparent to the original scheduler of the workload. Stated another way, the PCU logic performing method 200 may act independently to reschedule workloads scheduled by a primary scheduler of workloads on the processor. By rescheduling such workloads, greater opportunities for power savings by longer and deeper low power states may be realized.

Still referring to FIG. 2A, control passes next to block 250 where the compute engines can be controlled to be active during an active window. Thus the workloads scheduled to given compute engines can be executed during the active window. Note that one or more of the compute engines may not be idle during an active window and instead be in some type of low power state. Furthermore, active compute engines that are performing a workload may conclude execution of a given workload prior to the end of an active window. In this case, assuming that the compute engine does not have an additional workload to be executed, the compute engine may enter into a low power state for the remainder of the active window.

During one or more active windows, the alignment logic or a separate interrupt monitor logic of the PCU may analyze interrupt activity (block 252). In different embodiments, this monitoring of interrupt activity may be by way of receipt of information from various timer events, device activity indications or so forth. Based on this interrupt activity analysis, it can be determined whether an interrupt would be received during a next idle window (diamond 254). Such a determination may be made, for example, when a device is indicated to be activated during a next idle window. If so, control passes to block 256 where the current active window can be adjusted to accommodate the interrupt. This adjustment may be by lengthening the duration of the current active window such that when the impending interrupt is received, the processor (or at least relevant portions) is in an active state to be able to handle the interrupt without undesired latency.

In either case (whether the active window is adjusted or not) at the conclusion of an active window, control passes next to block 260 where the compute engines can be controlled to be in a low power state during an idle window. Note that this idle window is thus a forced window in which all compute engines of the processor are placed into a given low power state, e.g., a given deep low power state such that the entire package may be placed into an appropriate deep low power state.

Although the compute engines may be placed into such deep low power states, understand that certain conditions may cause the processor to exit the state prior to conclusion of an idle window. For example, although the self-aligning described herein may reduce or prevent interrupt receipt while in an idle window, such interrupt receipt is possible, particularly while the self-aligning is being initiated. Thus it can be determined whether an interrupt is received while in an idle window (diamond 262). In an embodiment, interrupt logic, which may be part of a uncore portion of a processor, may receive such interrupts. If no such interrupt is received, control passes to diamond 264 to determine whether the idle window has concluded. If so, control passes back to block 215, discussed above Instead if an interrupt is received, control passes to diamond 266 where it can be determined whether the priority of the interrupt exceeds a given threshold. Understand that a received interrupt may have a corresponding priority and when priority is above a given threshold level, actions may be taken to exit the idle window prior to its natural conclusion. Thus if this priority is exceeded, control passes to block 268 where the low power state is exited and the idle window is terminated such that at block 269 an active window is entered for the remaining portion of the previously scheduled idle window. Thereafter control passes back to block 215 as discussed above. Note in other cases the priority determination may not occur and the idle window is directly exited responsive to receipt of an interrupt. Understand that while shown at this high level in the embodiment of FIG. 2A, the scope of the present invention is not limited in this regard. For example, the dynamic rescheduling described in FIG. 2A may be performed when a SoC is in a semi-active state, e.g., when its activity level is less than given threshold.

Figure 2B:
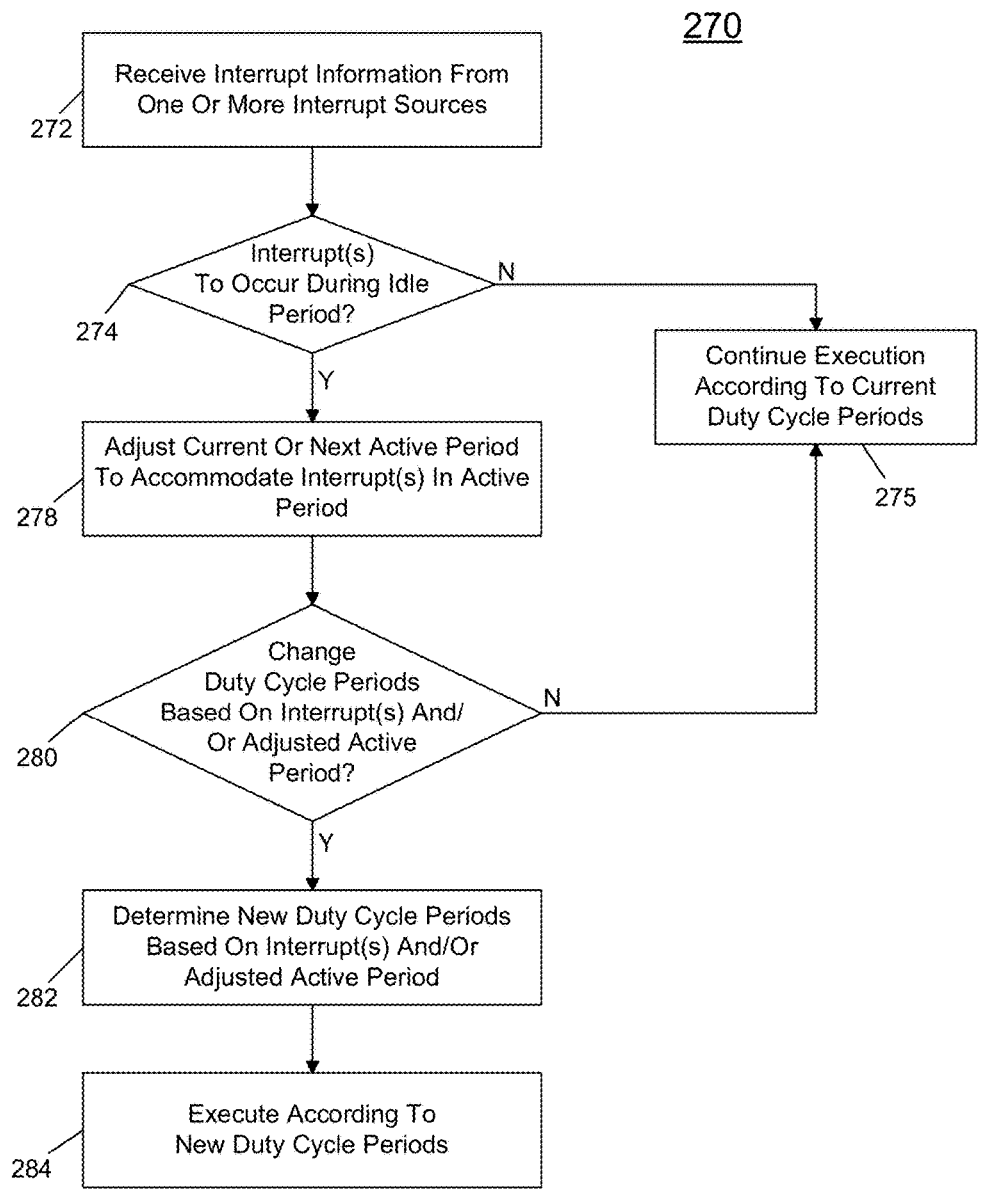
FIG. 2B is a flow diagram of further details of a method in accordance with an embodiment of the present invention.

Referring now to FIG. 2B, shown is a flow diagram of further details of a self-aligning duty cycle method in accordance with an embodiment of the present invention. As shown in FIG. 2B, method 270 may be performed by various logic of a PCU, including alignment logic and interrupt monitor logic. As seen, method 270 begins by receiving interrupt information from one or more interrupt sources (block 272). As described above, these interrupt sources may vary and can include information from a time to next event (TNTE) timer, one or more devices coupled to a processor, among other such sources. From this interrupt information, it can be determined whether one or more interrupts are to occur during an idle period (diamond 274). This determination may be based on a time at which such interrupts are indicated to occur and whether such time is within a scheduled active window or a scheduled idle window. If any impending interrupts are to occur during an active window, control passes to block 275 where execution continued according to the current duty cycle schedule of active windows and idle windows.

Still referring to FIG. 2B, instead if it is determined that one or more interrupts is to occur during an idle period control next passes to block 278, where the current or next active period may be adjusted. More specifically one or more such active periods may be adjusted to accommodate the interrupt(s) such that they occur during an active period to reduce interrupt handling latency. This adjustment may be by lengthening of a current or future active window to thus allow the interrupt to be received within the active window time period. Note that as a result of this adjustment to one or two active windows, a self-aligning process occurs such that if the interrupt is a periodic interrupt, future periodic interrupts will align with active windows and can be handled within the active windows such that improved interrupt handling is realized. This is so, as the extending of one (or several) windows causes a shift in the duty cycle phase.

Note that in some implementations instead of adjusting an active window by extending the window duration, interrupts may be accommodated by reducing the duration of one or several idle windows accordingly, such that the interrupts are received when the processor is in an active window.

Also as a result of the adjustment occurring to one or more windows, it is possible that adjustments to the duty cycles schedule may occur. Such adjustments may occur to maintain a long term desired duty cycle arrangement. Thus at diamond 280 it can be determined whether the duty cycle periods are to be changed based on either a periodic stream of interrupts and/or an adjusted active period. Note that if the periodic interrupts are not falling at a desired location within an active window (e.g., the interrupts are falling too close to a beginning or end of the active window), duty cycle adjustment may occur, at least as to phase to enable the periodic interrupts to be received within a more central portion of the active window. In addition, an adjustment of the duty cycle periods may occur to average out to a long term desired duty cycle (e.g., 40%) when one or more active or idle windows are adjusted to accommodate interrupts. If so, control passes to block 282 where the new duty cycle periods may be determined based on interrupt activity and/or an adjusted active period (block 282). Then at block 284 execution occurs according to these new duty cycle periods. Understand that while shown at this high level in the embodiment of FIG. 2B, the scope of the present invention is not limited in this regard.

In an example embodiment, a PC0 active state corresponds to a package C0 state which is an active state of the package in which high power is consumed and at least one compute engine is active. Also in this example embodiment a PC7 low power or idle state corresponds to a package C7 state which is the deepest idle state of the package, which means that both: (1) all compute engines in the package are in a low power (e.g., powered down) state; and (2) there is sufficient latency tolerance in the idle time to support the exit latency from that state.

Referring now to FIG. 3A, shown is a timing diagram of activity levels for a processor without interrupt self-aligning according to an embodiment of the present invention. As shown in FIG. 3A, a processor operates according to a duty cycling technique such that the processor modulates between active states and idle states. More specifically, in FIG. 3A, a processor is controlled to operate in an active state (here PC0) in which the processor is actively performing workloads in at least one active compute engine and thus is consuming some amount of power. Thereafter the processor operates in a deep low power state (here PC7) which is a deepest package idle state in which all compute engines are in a low power state.

The dashed line in FIG. 3A shows the expected operation states (and corresponding power consumption levels) in this alternating active and idle state arrangement. However, note the presence of interrupts received at a beginning of the deep low power states. Without using an embodiment of the present invention, each of these interrupts may cause an exit from the PC7 state to the PC0 state to thus accommodate the interrupts. In such situations, the duty cycle arrangement scheduled would not occur, and quite possibly the processor would be operating at a high power level for virtually all of its operating duration (assuming the interrupts shown in FIG. 3A continue at their periodic rate).

Thus the occurrence of software or device interrupts for soft real-time applications may disrupt the regular cadence of duty cycling (as represented by the dashed line), preventing or at least reducing residency in the deep low power state such as the crossed out PC7 states in FIG. 3A.

Instead referring to FIG. 3B, shown is a timing diagram of activity levels for a processor with interrupt self-aligning in accordance with an embodiment. As seen in FIG. 3B, responsive to the first interrupt received (either responsive to actual interrupt receipt, or responsive to receipt of interrupt information regarding this interrupt, e.g., as determined by information provided by a corresponding device, a TNTE timer or other source), a first active window may have its duration extended to accommodate this interrupt.

Thus as seen in FIG. 3B, by extending a first active time window to accommodate a first interrupt of a series of periodic interrupts, duty cycling self-aligns itself with the impending periodic interrupts such that these incoming interrupts occur during active durations. Note also in FIG. 3B that the active periods shift in phase to the right as compared to FIG. 3A. With proper policy and alignment, further periodic interrupts naturally align within the active time periods and thus become self-aligned. Understand while shown with this particular example in FIG. 3B, other manners of performing self-aligning can occur.

Figure 3C:
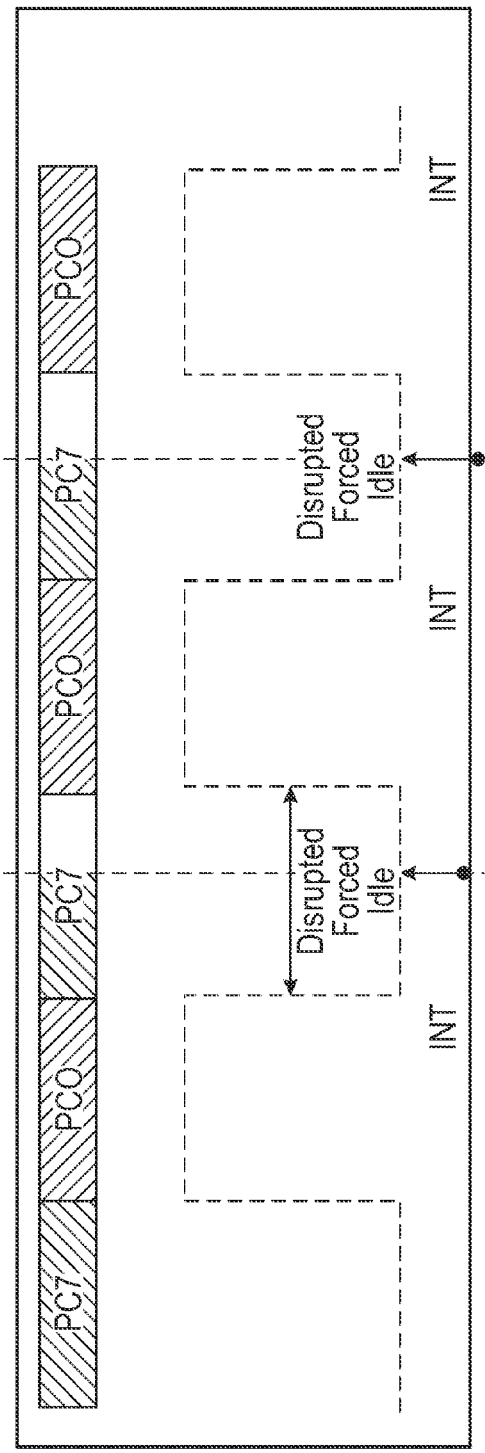
FIG. 3C is another timing diagram of activity levels for a processor without interrupt self-aligning according to an embodiment of the present invention.

Referring now to FIG. 3C, shown is a timing diagram of activity levels for a processor without interrupt self-aligning as described herein. As seen, a series of periodic interrupts fall within the idle windows, e.g., well within the idle windows, which may cause these idle periods to be terminated to handle the interrupts.

Figure 3D:
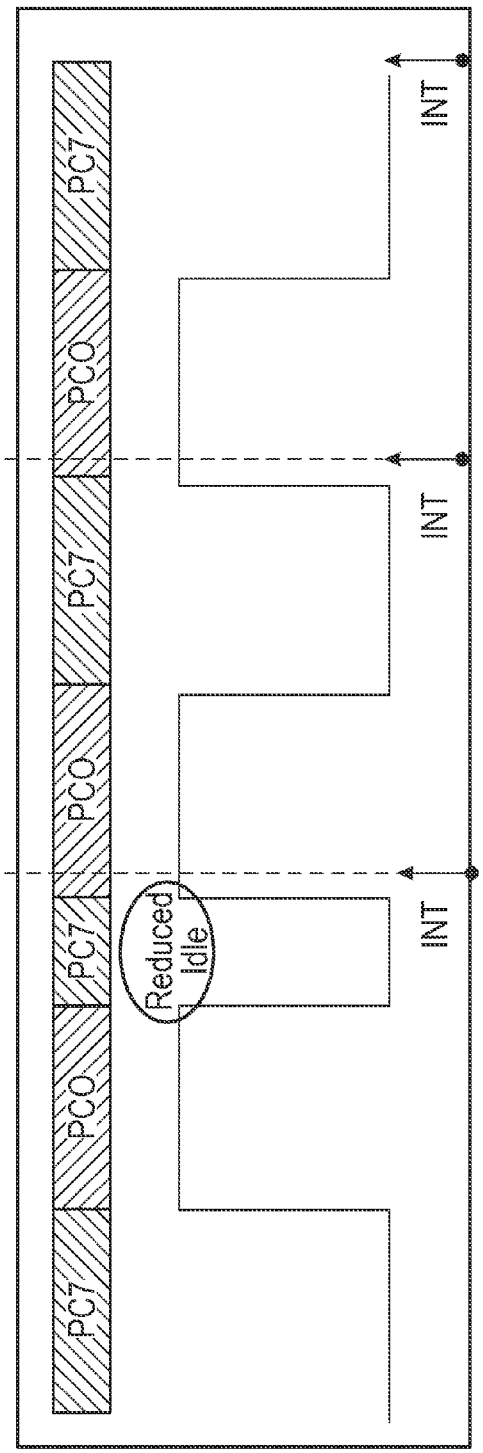
FIG. 3D is a timing diagram of activity levels for a processor with interrupt self-aligning in accordance with another embodiment of the present invention.

Instead referring to FIG. 3D, shown is a timing diagram of activity levels for a processor with interrupt self-aligning in accordance with another embodiment. Here note that the duration of a single idle window is shortened to accommodate this first interrupt. As such, the phase of the active and idle windows of the duty cycling is adjusted (i.e., moved left) and accommodation of these periodic interrupts during active windows is realized. Note further that based on advanced interrupt information received regarding these periodic interrupts, the reduced idle window and entry into the active window to accommodate this first periodic interrupt occurs at a time prior to receipt of the interrupt. As such, the processor is fully operational at the time the interrupt is received, further reducing latency of handling the interrupt. Thus as seen, various manners of controlling iteration of active and idle windows may occur to enable self-aligning of impending interrupts with active windows of a duty cycle arrangement.

Note that in different embodiments, various interrupt information sources may be queried for interrupt information and this information may be analyzed prior to entry into a forced idle phase to confirm that no disruption of a previously scheduled idle period is warranted. If instead this analysis results in a determination of reducing one or more idle time windows (or increasing such windows), or equivalently increasing or reducing one or more active time windows, such adjustment by duty cycle logic may occur to accommodate these adjustments. As such, duty cycling may quickly adjust to periodic software interrupts within a short time after initiation of the interrupts such that the processor settles into a self-aligned mode in which periodic interrupts are automatically aligned with active windows of an HDC operating mode.

This feature of interrupt self-aligning thus provides fine grained active/idle control to provide additional power savings in a processor, realizing optimal user experience and quality of service. Furthermore, understand that such dynamic adjustment may occur without user-level software intervention and also preserves real-time boundaries of applications such as video/audio playback, video conferencing and so forth. Embodiments thus may inherently align or shift HDC active phases to coincide with periodic or aperiodic interrupts, facilitating higher concurrency, lower latency and reduced power consumption.

Figure 4:
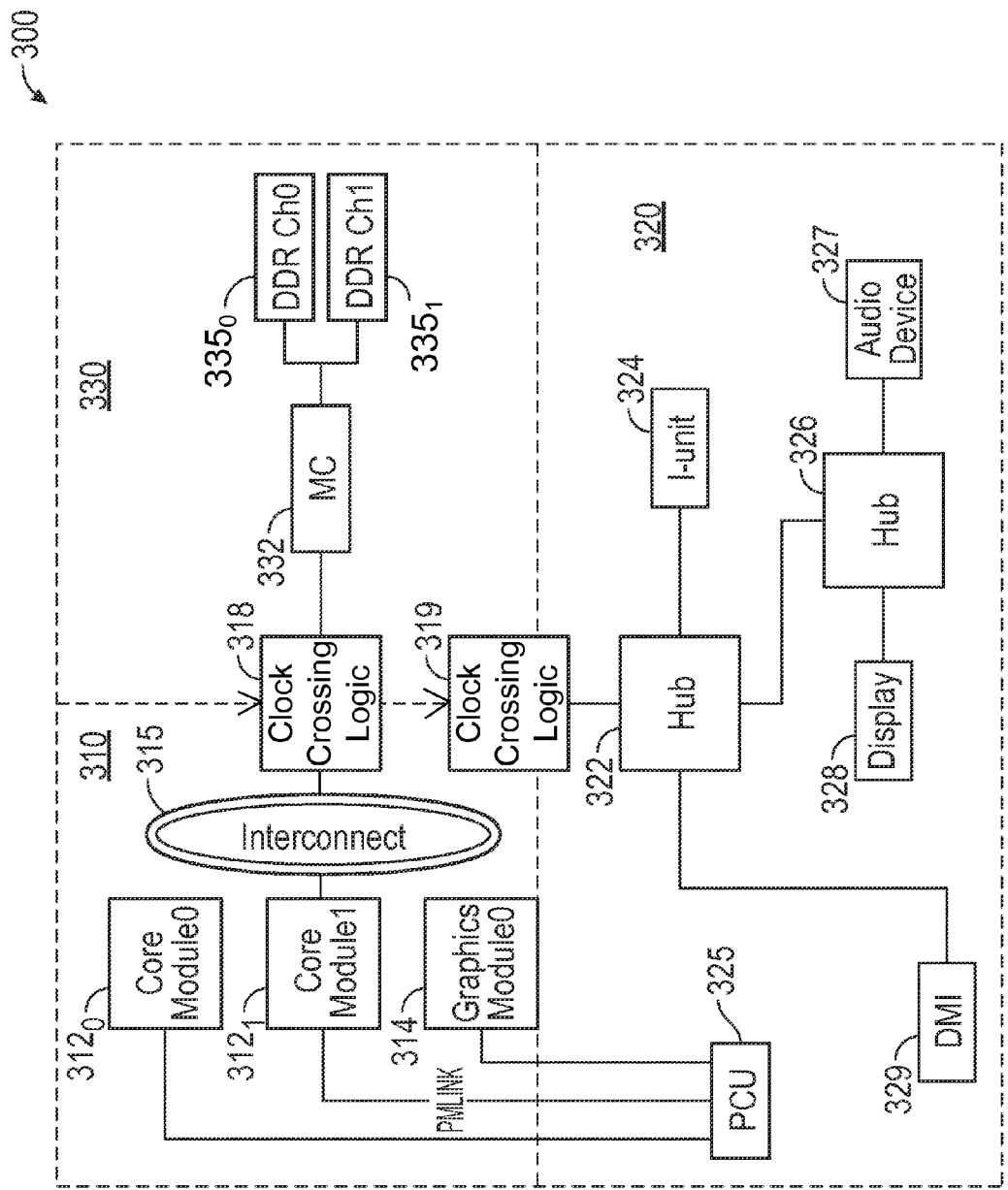
FIG. 4 is a block diagram of a SoC in accordance with an embodiment of the present invention.

Referring now to FIG. 4, shown is a block diagram of an SoC in accordance with an embodiment of the present invention. As shown in FIG. 4, SoC 300 includes multiple independent domains, each of which may operate at independent voltages and/or operating frequencies. In the embodiment shown, a first domain 310 corresponds to a coherent domain, a second domain 320 corresponds to a non-coherent domain, and a third domain 330 corresponds to a memory domain.

Coherent domain 310 includes the various compute engines of the SoC, including a plurality of core modules $312_0$-$312_1$. In addition, a graphics module 314 is provided. Understand that while shown with a few such compute engines, in other implementations many more compute engines may be provided. To enable interconnection between the various compute engines, an interconnect 315 is present, which in an embodiment may be a ring interconnect. To provide for dynamic rescheduling and alignment as described herein, each of the compute engines couple to a PCU 325 of a non-coherent domain 320 via a corresponding power management link. In general, PCU 325 includes various logic to monitor power management information and to apply policy to enable the compute engines to operate at given voltages/frequencies. Furthermore, PCU 325 includes alignment and interrupt monitor logic to dynamically reschedule workloads to enable concurrency of active states for the compute engines during an active window and inactive or idle states of the compute engines during an idle window and further to adjust one or more active or idle windows based on interrupt activity, as described herein.

Still referring to FIG. 4, non-coherent domain 320 may include various peripheral devices and interfaces to off-chip devices. As shown in FIG. 4, non-coherent domain 320 further includes hubs 322 and 326, which are provided as links to various devices in the non-coherent domain. As seen, hub 322 interfaces with an image unit 324 and a direct media interface 329. In turn, hub 326 interfaces with an audio device 327 and a display device 328.

With regard to memory domain 330, a memory controller 332 is provided that interfaces with a pair of memory channel interfaces, namely a first memory interface $335_0$ and a second memory interface $335_1$.

To enable interconnection between the different domains, which may operate at different frequencies, clock crossing logics 318 and 319 are provided. Although shown at this high level in the embodiment of FIG. 4, understand the scope of the present invention is not limited in this regard.

Figure 5:
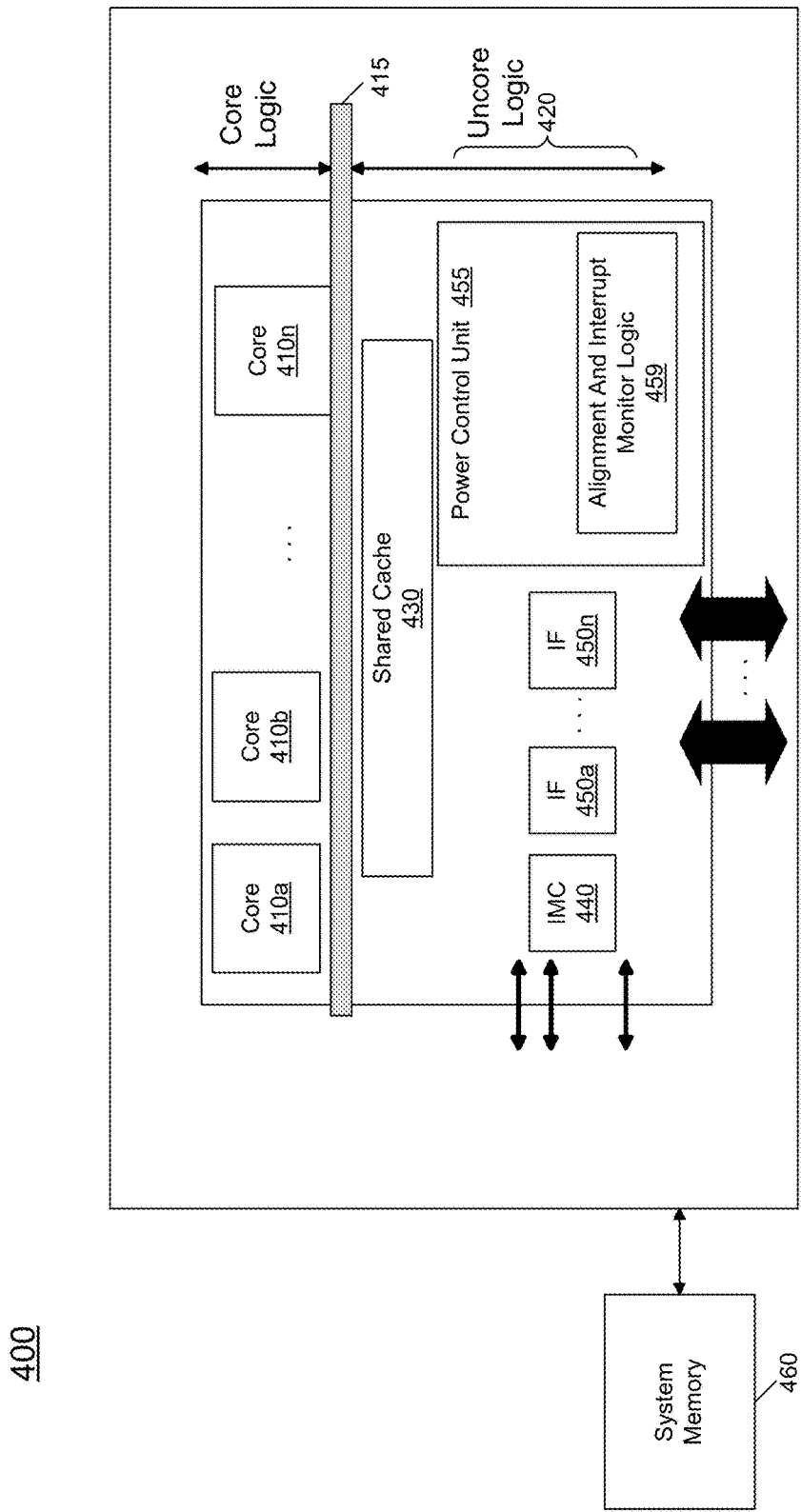
FIG. 5 is a block diagram of a processor in accordance with an embodiment of the present invention.

Embodiments can be implemented in processors for various markets including server processors, desktop processors, mobile processors and so forth. Referring now to FIG. 5, shown is a block diagram of a processor in accordance with an embodiment of the present invention. As shown in FIG. 5, processor 400 may be a multicore processor including a plurality of cores $410_a$-$410_n$. In one embodiment, each such core may be of an independent power domain and can be configured to enter and exit active states and/or maximum performance states based on workload. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455. In various embodiments, power control unit 455 may include an alignment and interrupt monitor logic 459 in accordance with an embodiment of the present invention. Using this logic, workloads scheduled to the cores (and other agents) of the processor may be rescheduled to be aligned in active times of a cycling interval and to be in a low power state during inactive times of a cycling interval, and where these active or inactive times may be adjusted to accommodate interrupt activity as described herein.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
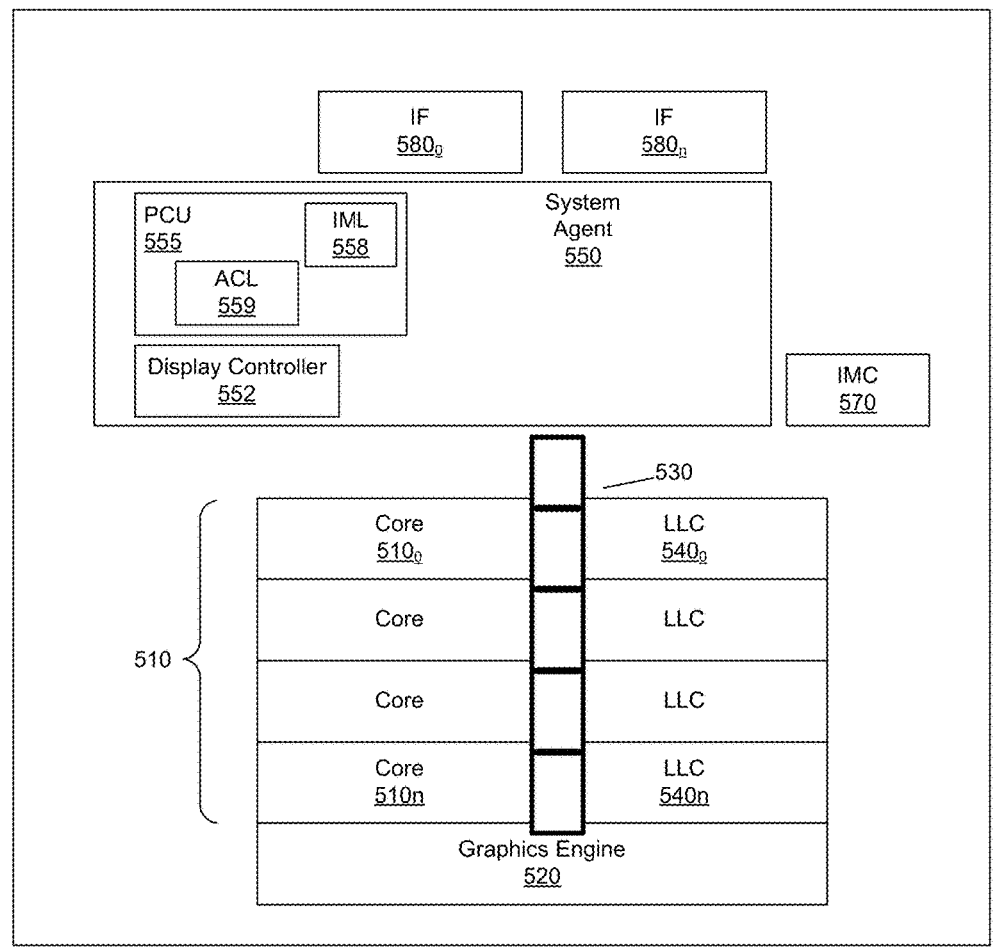
FIG. 6 is a block diagram of a multi-domain processor in accordance with another embodiment of the present invention.

Referring now to FIG. 6, shown is a block diagram of a multi-domain processor in accordance with another embodiment of the present invention. As shown in the embodiment of FIG. 6, processor 500 is a SoC including multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include an alignment control logic 559 in accordance with an embodiment of the present invention to dynamically analyze processor operation and perform dynamic realignment of workloads scheduled to the cores and/or graphics engine and to enable the aligned low power inactive portions of cycle intervals, when the processor is semi-active or lightly loaded. In various embodiments, this logic may execute the algorithm described above in FIG. 2A. PCU 555 may further include a separate interrupt monitor logic 558 to dynamically monitor impending interrupt activity and adjust one or more active and/or idle windows based thereon.

As further seen in FIG. 6, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 6, understand the scope of the present invention is not limited in this regard.

Figure 7:
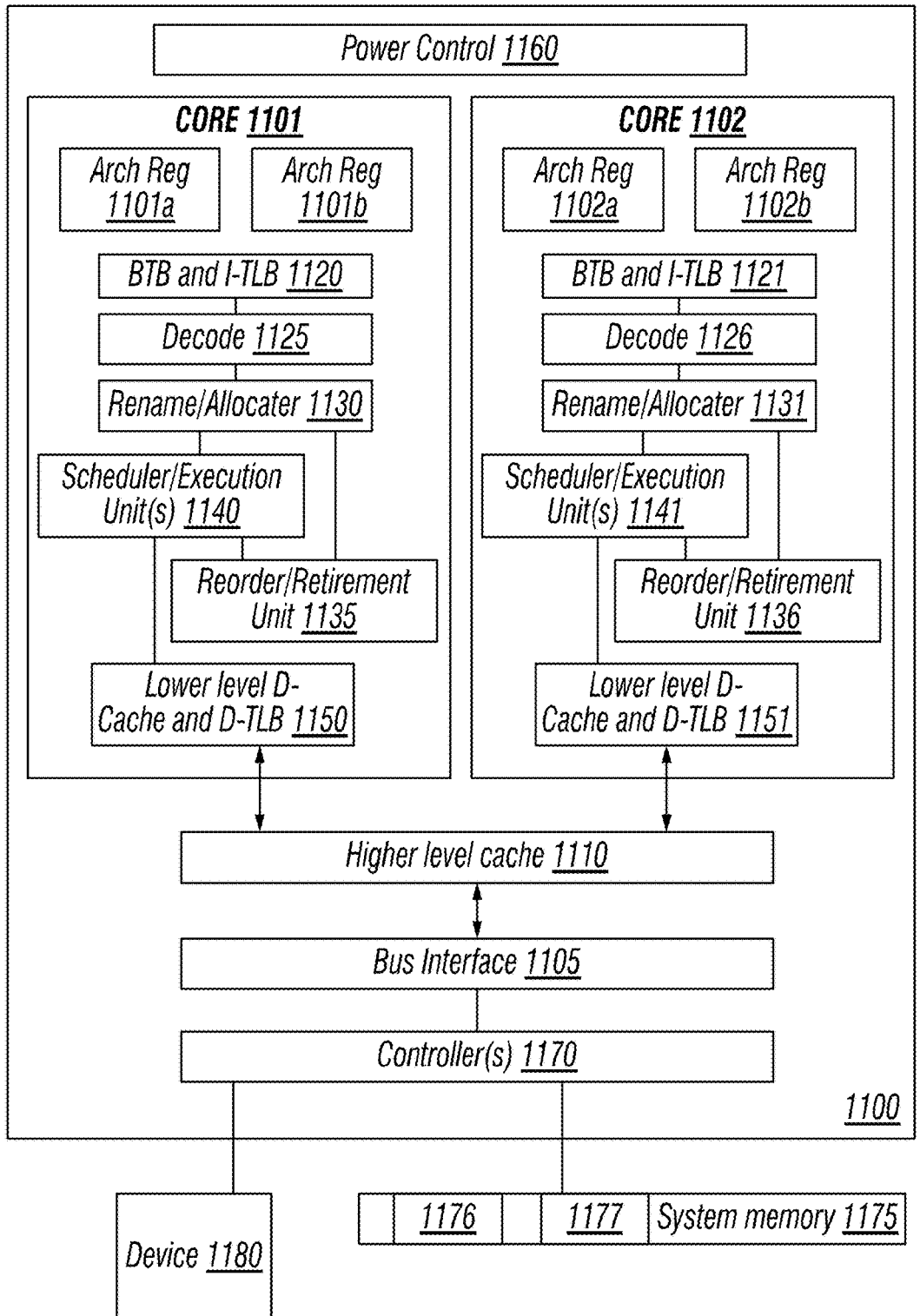
FIG. 7 is an embodiment of a processor including multiple cores.

Referring to FIG. 7, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 7, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 7, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 8:
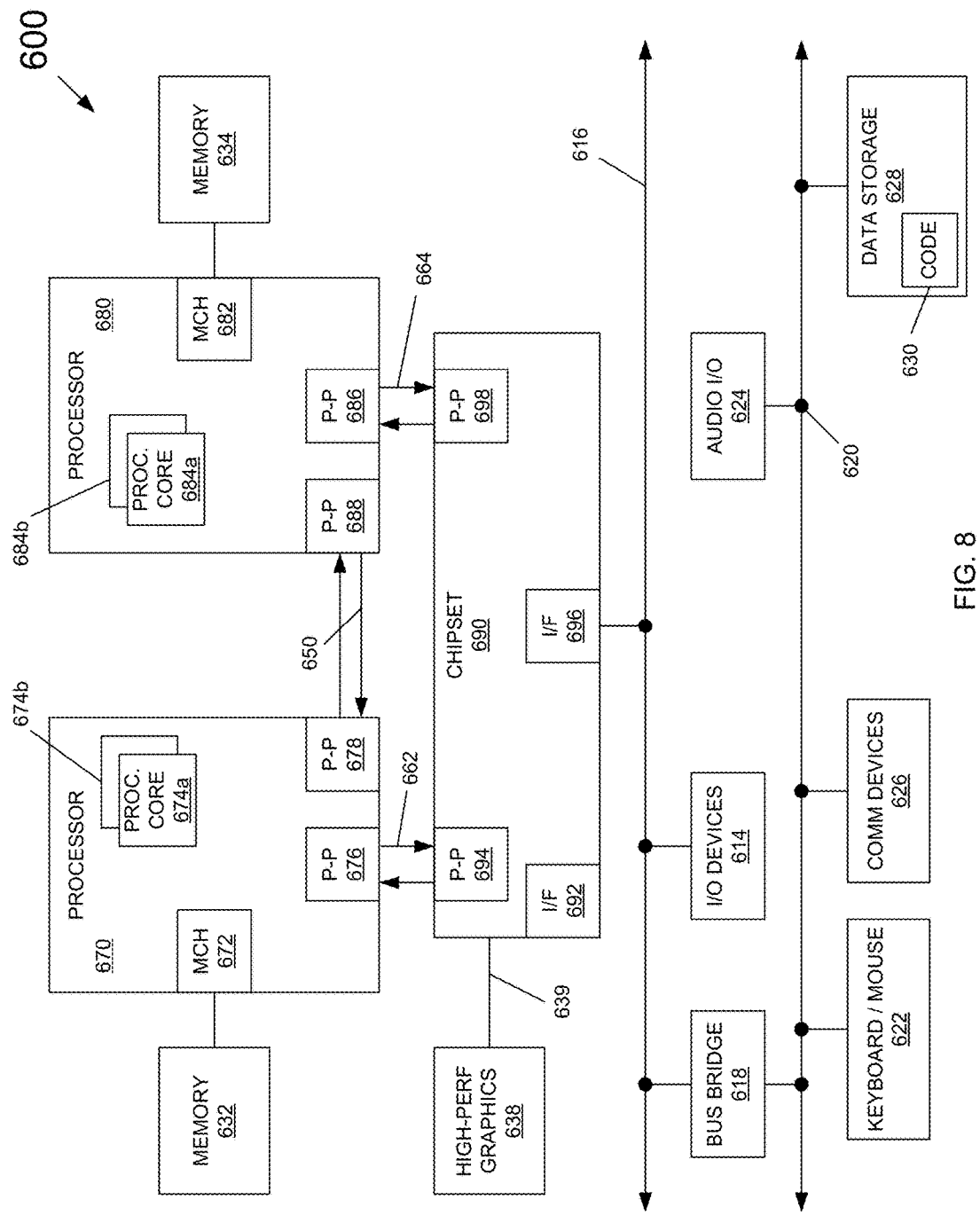
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 600 is a point-to-point interconnect system, and includes a first processor 670 and a second processor 680 coupled via a point-to-point interconnect 650. As shown in FIG. 8, each of processors 670 and 680 may be multicore processors, including first and second processor cores (i.e., processor cores 674*a* and 674*b* and processor cores 684*a* and 684*b*), although potentially many more cores may be present in the processors. Each of the processors can include a PCU or other logic to dynamically reschedule workloads to enable alignment of active and low power states for the various cores other engines, and to further adjust a duration of one or more of the active states (and/or low power states) based on impending interrupt activity to enable self-alignment of processor active states with incoming interrupts as described herein.

Still referring to FIG. 8, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 8, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 8, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 8, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Figure 9:
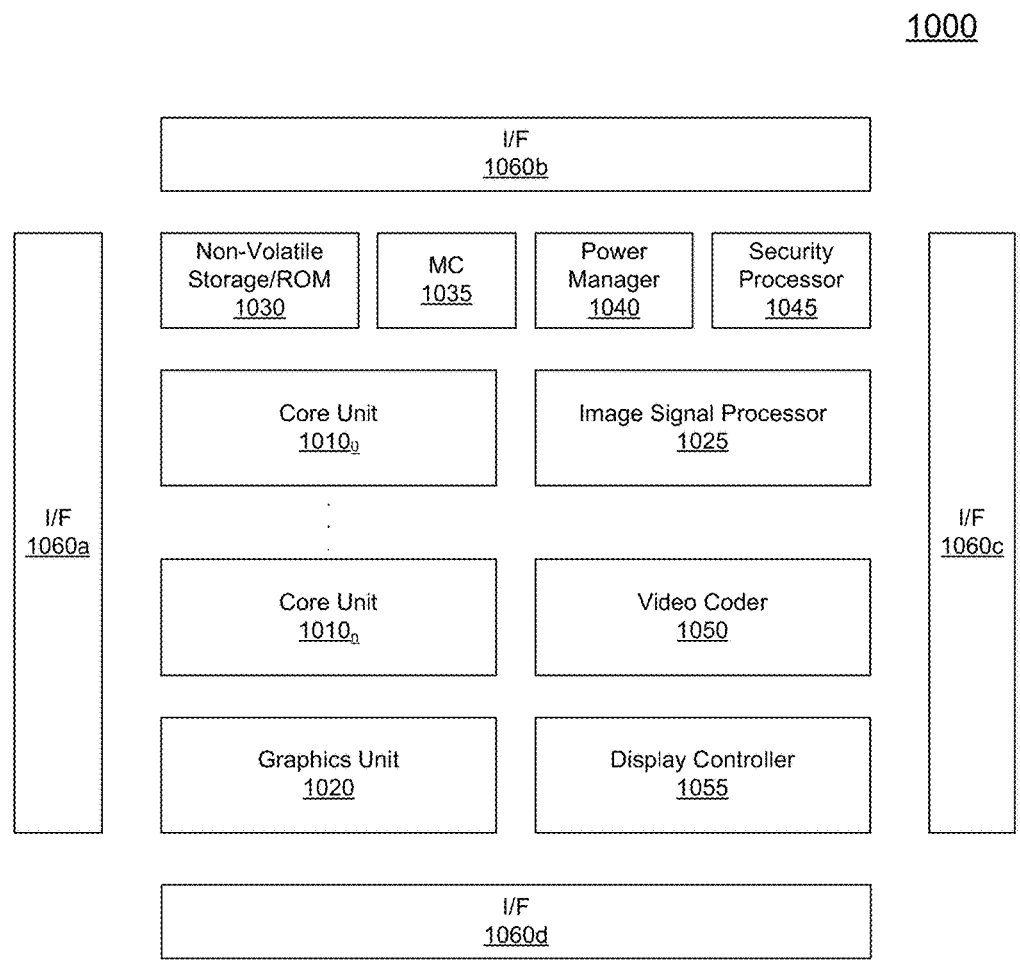
FIG. 9 is a block diagram of a processor in accordance with another embodiment of the present invention.

Referring now to FIG. 9, shown is a block diagram of a processor in accordance with another embodiment of the present invention. In the embodiment of FIG. 9, processor 1000 may be a system on a chip (SoC) including multiple domains, each of which may be controlled to operate at an independent operating voltage and operating frequency. As a specific illustrative example, processor 1000 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or customer thereof or a MIPS-based design from MIPS Technologies, Inc. of Sunnyvale, Calif., or their licensees or adopters may instead be present in other embodiments such as an Apple A5 processor, a Qualcomm Snapdragon processor, or Texas Instruments OMAP processor. Such SoC may be used in a low power system such as a smartphone, tablet computer, Ultrabook™ computer or other portable computing device.

In the high level view shown in FIG. 9, processor 1000 includes a plurality of core units $1010_0$-$1010_n$. Each core unit may include one or more processor cores, one or more cache memories and other circuitry. Each core unit 1010 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.) or other instruction set or combinations thereof. Note that some of the core units may be heterogeneous resources (e.g., of a different design). In addition, each such core may be coupled to a cache memory which in an embodiment may be a shared level (L2) cache memory. A non-volatile storage 1030 may be used to store various program and other data. For example, this storage may be used to store at least portions of microcode, boot information such as a BIOS, other system software or so forth.

Each core unit 1010 may also include an interface such as a bus interface unit to enable interconnection to additional circuitry of the processor. In an embodiment, each core unit 1010 couples to a coherent fabric that may act as a primary cache coherent on-die interconnect that in turn couples to a memory controller 1035. In turn, memory controller 1035 controls communications with a memory such as a dynamic random access memory (DRAM) (not shown for ease of illustration in FIG. 9).

In addition to core units, additional processing engines are present within the processor, including at least one graphics unit 1020 which may include one or more graphics processing units (GPUs) to perform graphics processing as well as to possibly execute general purpose operations on the graphics processor (so-called GPGPU operation). In addition, at least one image signal processor 1025 may be present. Signal processor 1025 may be configured to process incoming image data received from one or more capture devices, either internal to the SoC or off-chip. Other accelerators also may be present. In the illustration of FIG. 9, a video coder 1050 may perform coding operations including encoding and decoding for video information, e.g., providing hardware acceleration support for high definition video content. A display controller 1055 further may be provided to accelerate display operations including providing support for internal and external displays of a system. In addition, a security processor 1045 may be present to perform security operations such as secure boot operations, various cryptography operations and so forth.

Each of the units may have its power consumption controlled via a power manager 1040. Power manager 1040 includes alignment control logic to perform dynamic rescheduling of workloads from an original scheduling generated by a primary scheduler (e.g., OS or VMM) to a revised schedule generated by the alignment control logic, to align active and idle times for the cores and other processors, as described herein. Power manager 1040 further includes interrupt monitor logic to monitor impending interrupts or other interrupt information and to adjust one or more active (and/or idle) times based thereon.

In some embodiments, SoC 1000 may further include a non-coherent fabric coupled to the coherent fabric to which various peripheral devices may couple. One or more interfaces 1060*a*-1060*d* enable communication with one or more off-chip devices. Such communications may be according to a variety of communication protocols such as PCIe™, GPIO, USB, I2C, UART, MIPI, SDIO, DDR, SPI, HDMI, among other types of communication protocols. Although shown at this high level in the embodiment of FIG. 9, understand the scope of the present invention is not limited in this regard.

The following examples pertain to further embodiments.

In one example, a processor comprises: a plurality of cores to independently execute instructions; and a PCU including a duty cycle logic to set a duty cycle having a cycle time formed of an active time window in which at least some of the plurality of cores are to be active and an idle time window in which the plurality of cores are to be in a low power state, where the duty cycle logic is to adjust a duration of at least one of an active time window and an inactive time window based on interrupt information to accommodate an impending interrupt within the active time window.

In an example, the processor further includes a next event timer to provide the interrupt information, where the interrupt information comprises a time at which a next event is to occur in the processor. The interrupt information may be a device activity indication to indicate a time at which a device coupled to the processor is to exit a low power state.

In an example, the duty cycle logic further comprises an interrupt monitor logic to receive the interrupt information and to adjust the active time window such that a first interrupt is received during the active time window instead of during the inactive time window. The interrupt monitor logic may cause a first active time window to be extended to enable a first interrupt identified in the interrupt information to be handled during the first active window and prior to a first idle time window following the first active time window.

In an example, the interrupt monitor logic may adjust a phase of the duty cycle to accommodate an interrupt stream during active time windows of the duty cycle. The duty cycle logic may also adjust the duty cycle based at least in part on the adjusted active time window or the adjusted idle time window.

In an example, the processor may be a SoC to enter a package low power state for the duration of the idle time window.

In an example, the PCU further comprises an alignment logic to cause at least one workload to be executed on a first core of the plurality of cores to be rescheduled from a first time within an inactive time window to a different time within an active time window. The at least one workload may be initially scheduled by an OS to execute at the first time, and wherein the second time is before the first time, the rescheduling transparent to the OS.

In an example, the processor further comprises at least one graphics engine to independently execute graphics instructions, where the alignment logic is to align a first workload to execute on a first core of the plurality of cores concurrently with execution of a second workload on the at least one graphics engine, where the alignment logic is to reschedule at least one of the first and second workloads to enable the concurrent execution.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a machine-readable medium has stored thereon instructions, which if performed by a machine cause the machine to perform a method comprising: receiving interrupt information regarding an interrupt to be received in a processor operating according to a duty cycle schedule having alternating active states and low power states, the interrupt to be received when the processor is scheduled to be in a low power state of the duty cycle schedule; adjusting a duration of one of a first active state and a first low power state based at least in part on the interrupt information, to enable the processor to be in the first active state when the interrupt is received; and thereafter reverting to a scheduled duration for a plurality of succeeding active states and low power states following the adjusted first active state or the adjusted first low power state.

In an example, the method further comprises: receiving first interrupt information from a next event timer, where the first interrupt information comprises a time at which a next event is to occur in the processor; and receiving second interrupt information from a device coupled to the processor, where the second interrupt information comprises a device activity indication to indicate a time at which the device is to exit a low power state.

In an example, the method further comprises adjusting a phase of the duty cycle schedule via the duration adjustment. The method may further comprise adjusting the duty cycle schedule phase to accommodate a periodic interrupt stream during active states of the duty cycle schedule.

In another example, a computer readable medium including instructions is to perform the method of any of the above examples.

In another example, an apparatus comprises means for performing the method of any one of the above examples.

In another example, a system comprises: a SoC including a coherent domain having a plurality of cores and at least one graphics engine, a non-coherent domain including at least one peripheral device, and a memory domain to interface with a memory coupled to the SoC. In an example, the SoC further includes a power controller to analyze device interrupt information for the at least one peripheral device to determine a receipt time for an interrupt stream to be received from the at least one peripheral device, and adjust a phase of a duty cycle schedule having a series of active states and low power states, to accommodate receipt of the interrupt stream within the series of active states of the duty cycle schedule. The system may further include the memory coupled to the SoC.

In an example, the power controller is further to receive duty cycle policy information, and determine a duration for each of the series of active states and a duration for each of the series of idle states based at least in part on the duty cycle policy information.

In an example, the power controller is further to adjust a duration of at least one of a first active state and a first idle state to accommodate the interrupt stream receipt. The power controller may further realign a workload to be executed on the at least one graphics engine to be executed at the different time to enable the at least one graphics engine to be active during the series of active states and to be in a low power state during the series of low power states.

In an embodiment, the power controller is to query a timer to determine the receipt time for at least one interrupt of the interrupt stream. The power controller may receive device activity information from the at least one peripheral device and to determine the receipt time for the interrupt stream based at least in part on the device activity information.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
 a plurality of cores to independently execute instructions; and
 a power control unit (PCU) including a duty cycle logic to set a duty cycle having a plurality of duty cycle periods each having a cycle time formed of an active time window in which at least some of the plurality of cores are to be active and an idle time window in which the plurality of cores are to be in a low power state, wherein the duty cycle logic is to receive interrupt information regarding an impending interrupt, and after receipt of the interrupt information adjust a duration of at least one of an active time window and an inactive time window of a first duty cycle period of the plurality of duty cycle periods to cause a shift in a phase of the duty cycle based on the interrupt information regarding the impending interrupt, wherein the shift in the phase of the duty cycle is to cause at least one core of the at least some of the plurality of cores to be within the active time window when the impending interrupt is received.

2. The processor of claim 1, further comprising a next event timer to provide the interrupt information, wherein the interrupt information comprises a time at which a next event is to occur in the processor.

3. The processor of claim 1, wherein the interrupt information comprises a device activity indication to indicate a time at which a device coupled to the processor is to exit a low power state.

4. The processor of claim 1, wherein the duty cycle logic comprises an interrupt monitor logic to receive the interrupt information and to adjust the active time window such that the impending interrupt is received during the active time window instead of during the inactive time window.

5. The processor of claim 4, wherein the interrupt monitor logic is to cause a first active time window to be extended to enable the impending interrupt identified in the interrupt information to be handled during the first active window and prior to a first idle time window following the first active time window.

6. The processor of claim 4, wherein the interrupt monitor logic is to shift the phase of the duty cycle to accommodate a periodic or aperiodic interrupt stream during active time windows of the duty cycle.

7. The processor of claim 1, wherein the duty cycle logic is to adjust the duty cycle based at least in part on the adjusted active time window or the adjusted idle time window.

8. The processor of claim 1, wherein the processor comprises a system on chip (SoC), and the SoC is to enter a package low power state for the duration of the idle time window.

9. The processor of claim 1, wherein the PCU further comprises an alignment logic to cause at least one workload to be executed on a first core of the plurality of cores to be rescheduled from a first time within an inactive time window to a different time within an active time window.

10. The processor of claim 9, wherein the at least one workload is initially scheduled by an operating system (OS) to execute at the first time, and wherein the different time is before the first time, the rescheduling transparent to the OS.

11. The processor of claim 9, further comprising at least one graphics engine to independently execute graphics instructions, wherein the alignment logic is to align a first workload to execute on the first core concurrently with execution of a second workload on the at least one graphics engine, wherein the alignment logic is to reschedule at least one of the first and second workloads to enable the concurrent execution.

12. A non-transitory machine-readable medium having stored thereon instructions, which if performed by a machine cause the machine to perform a method comprising:
 receiving interrupt information regarding an interrupt to be received in a processor operating according to a duty cycle schedule having alternating active states and low power states of the processor, the interrupt to be received when the processor is scheduled to be in a low power state of the duty cycle schedule;

adjusting a duration of one of a first active state and a first low power state based at least in part on the interrupt information to cause a phase shift in the duty cycle schedule, wherein the phase shift in the duty cycle schedule is to cause the processor to be in the adjusted first active state when the interrupt is received; and thereafter reverting to a scheduled duration for a plurality of succeeding active states and low power states following the adjusted first active state or the adjusted first low power state according to the duty cycle schedule having the phase shift.

13. The non-transitory machine-readable medium of claim 12, wherein the method further comprises:

receiving first interrupt information from a next event timer, wherein the first interrupt information comprises a time at which a next event is to occur in the processor; and receiving second interrupt information from a device coupled to the processor, wherein the second interrupt information comprises a device activity indication to indicate a time at which the device is to exit a low power state.

14. The non-transitory machine-readable medium of claim 12, wherein the method further comprises receiving and handling the interrupt by the processor during the adjusted first active state.

15. The non-transitory machine-readable medium of claim 14, wherein the method further comprises adjusting the duty cycle schedule phase to accommodate an interrupt stream during active states of the duty cycle schedule.

16. A system comprising:

a system on chip (SoC) including a coherent domain having a plurality of cores and at least one graphics engine, a non-coherent domain including at least one peripheral device, and a memory domain to interface with a memory coupled to the SoC, the SoC further including a power controller to analyze device interrupt information for the at least one peripheral device to determine a receipt time for an interrupt stream to be received from the at least one peripheral device, and adjust a phase of a duty cycle schedule of at least the plurality of cores having a series of active states and low power states, the adjusted phase of the duty cycle schedule to cause the at least the plurality of cores to be within the series of active states of the duty cycle schedule upon receipt of the interrupt stream; and the memory coupled to the SoC.

17. The system of claim 16, wherein the power controller is further to receive duty cycle policy information, and determine a duration for each of the series of active states and a duration for each of the series of low power states based at least in part on the duty cycle policy information.

18. The system of claim 16, wherein the power controller is further to adjust a duration of at least one of a first active state and a first low power state to accommodate the interrupt stream receipt.

19. The system of claim 16, wherein the power controller is to further realign a workload to be executed on the at least one graphics engine to be executed at a different time to enable the at least one graphics engine to be active during the series of active states and to be in a low power state during the series of low power states.

20. The system of claim 16, wherein the power controller is to query a timer to determine the receipt time for at least one interrupt of the interrupt stream.

21. The system of claim 16, wherein the power controller is to receive device activity information from the at least one peripheral device and to determine the receipt time for the interrupt stream based at least in part on the device activity information.

* * * * *